Sept. 17, 1929.  J. HOJNOWSKI  1,728,761
AUTOMOBILE SNOWPLOW
Filed Dec. 27, 1927
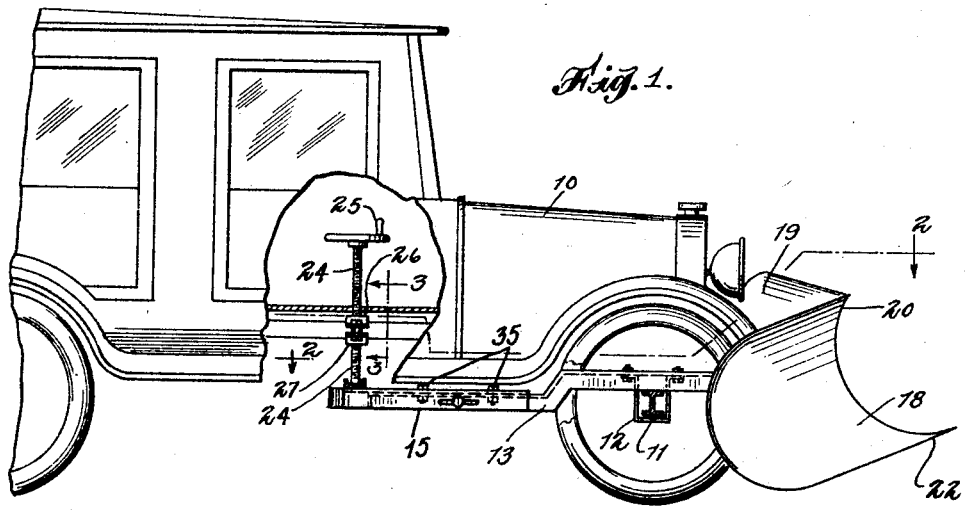
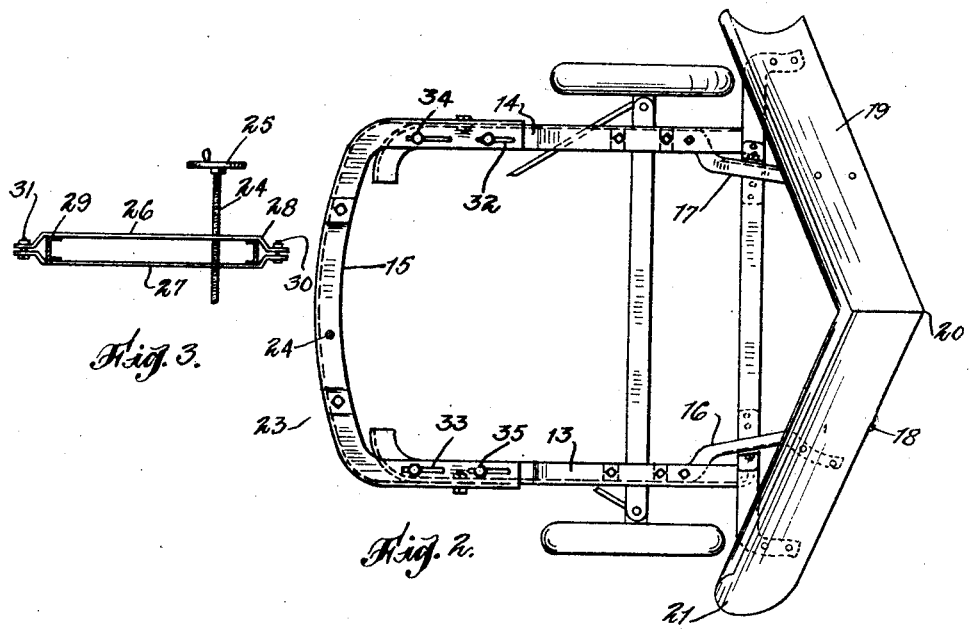
Inventor
Jakob Hojnowski Patented Sept. 17, 1929

1,728,761

UNITED STATES PATENT OFFICE

JAKOB HOJNOWSKI, OF NEKOOSA, WISCONSIN

AUTOMOBILE SNOWPLOW

Application filed December 27, 1927. Serial No. 242,886.

This invention relates to improvements in snow cleaning and removing devices, particularly for use on automobiles or the like vehicles, and it is the principal object of my invention to provide a snow plow for automobiles which can be readily lowered and raised from the driver's seat.

Another object of my invention is the provision of a snow plow of simple construction which can be readily attached to any make of automobiles without material change in their construction.

A further object of my invention is the provision of an automobile plow, the shares of which are angularly disposed to each other and curved towards the front, and which is highly efficient in its operation.

These and other objects and advantages of my invention will become more fully known as the description thereof proceeds, and will then be specifically defined in the appended claim.

In the accompanying drawing forming a material part of this disclosure:

Fig. 1 is a side elevation of an automobile equipped with a snow plow constructed according to my invention, parts being broken away and parts being shown in section for the sake of clearer illustration.

Fig. 2 is a top plan view seen along the line 2—2 of Fig. 1.

Fig. 3 is a detail view partly in section on line 3—3 of Figure 1.

As illustrated, an automobile 10 of any well known type has loosely engaging its front axle 11 hangers 12 which are attached at their upper ends to the side bars 13, 14, of a frame 15. To the front ends of the side bars brackets 16, 17 are attached with their inner ends, and to the outer ends of said brackets or arms the snow plow shares 18, 19 are secured in any well known suitable manner, meeting at their inner ends at an angle as indicated at 20, and each share being curved as indicated at 21, to form a lower projecting scoop like edge 22.

The inner frame bar 15 carries a socket for engagement by the lower end of an operating screw 24 adapted to be operated by means of the hand wheel 25 or the like for depressing the rear end bar 15 of the plow frame to raise the shares or to allow a lowering of the same under their own weight and in this instance screw 24 will serve to limit their downward movement and the upward movement of the frame's rear end as the same tilts about the front axle.

The screw 24 is guided at its lower part in threaded holes in the branches 26, 27 of a transverse bracket held on the frame bars 28, 29 of the automobile truck by fastening screws 30, 31, passed through the parallel and offset end of branches 26, 27.

In order to make it fit for automobiles of any length, the frame 15 is made extensible by providing longitudinally extending slots 32, 33 in its forwardly extending branches overlapping and resting upon the rearwardly extending ends of bars 13, 14 which carry at their upper faces headed pins 34, 35 extending or projecting through slots 32, 33 and allowing an adjustment. The inner ends of bars 13, 14 are curved as shown in Figure 2 in order to present a suitable resting place for frame 15.

The operation of my device will be entirely clear from the above description by simultaneous inspection of the drawing, and it is to be understood that I may make such changes as come within the scope of the appended claim without departure from my invention.

Having thus described my invention what I claim as new and desire to secure by Letters Patent is:—

In a snow plow for automobiles, hangers on the front axle of the automobile, a frame composed of side bars to which said hangers are attached, curved inner ends on said side bars, a rear bar for said frame, provided with longitudinally extending slots in its forwardly extending branches, overlapping the said side bars, a means for allowing a rearward and forward adjustment of the frame and rear bar and locking of the same in their adjusted position, a transverse bracket, a screw guided by said bracket, a socket on the rear bar of said frame adapted to receive one end of said screw, a hand wheel on said screw for depressing and elevating said frame and a pair of angularly disposed curved snow plow shares secured to said side bars adapted to be elevated and lowered, by the proper operation of said screw and hand wheel.

Signed at Nekoosa, in the county of Wood and State of Wisconsin, this 10th day of October, A. D. 1927.

JAKOB HOJNOWSKI.